United States Patent
Bergström et al.

(10) Patent No.: US 11,581,975 B2
(45) Date of Patent: *Feb. 14, 2023

(54) WIRELESS DEVICE, A NETWORK NODE AND METHODS THEREIN FOR ENABLING AND PERFORMING AN UPLINK CONTROL CHANNEL TRANSMISSION

(71) Applicant: Telefonaktiebolaget LM Ericsson (publ), Stockholm (SE)

(72) Inventors: Mattias Bergström, Stockholm (SE); Yu Yang, Solna (SE); Marco Belleschi, Solna (SE)

(73) Assignee: Telefonaktiebolaget LM Ericsson (publ), Stockholm (SE)

(*) Notice: Subject to any disclaimer, the term of this patent is extended or adjusted under 35 U.S.C. 154(b) by 309 days.

This patent is subject to a terminal disclaimer.

(21) Appl. No.: 16/902,785

(22) Filed: Jun. 16, 2020

(65) Prior Publication Data

US 2020/0313792 A1    Oct. 1, 2020

Related U.S. Application Data (63) Continuation of application No. 16/374,497, filed on Apr. 3, 2019, now Pat. No. 10,721,014, which is a (Continued)

(51) Int. Cl.
*H04L 1/00* (2006.01)
*H04L 5/00* (2006.01)
(Continued)

(52) U.S. Cl.
CPC .......... *H04L 1/0006* (2013.01); *H04L 5/001* (2013.01); *H04L 5/0053* (2013.01);
(Continued)

(58) Field of Classification Search
None
See application file for complete search history.

(56) References Cited

U.S. PATENT DOCUMENTS

| 8,526,310 | B2 | 9/2013 | Dinan |
| 8,553,655 | B1 | 10/2013 | Dinan |
| (Continued) | | | |

FOREIGN PATENT DOCUMENTS

| WO | 2006125149 A2 | 11/2006 |
| WO | 2011063244 A2 | 5/2011 |
| WO | 2015093615 A1 | 6/2015 |

OTHER PUBLICATIONS

Alcatel-Lucent, "R2-095888: Carrier Aggregation," 3rd Generation Partnership Project (3GPP), TSG-RAN WG2 Meeting #67bis, Oct. 24-28, 2009, 5 pages, Miyazaki, Japan.
(Continued)

*Primary Examiner* — Edan Orgad
*Assistant Examiner* — Emmanuel K Maglo
(74) *Attorney, Agent, or Firm* — Withrow & Terranova, PLLC (57) ABSTRACT

A method performed by a wireless device for performing an uplink control channel transmission in a serving cell in a wireless communications network is provided. The wireless device is configured with a set of serving cell(s) in the wireless communications network. First, the wireless device determines a number of serving cells of the set of serving cell(s) that are relevant to consider when performing the uplink control channel transmission in the serving cell. Secondly, the wireless device selects an uplink control channel format from a set of uplink control channel formats for uplink control channel transmissions based on the determined number of serving cells. Then, the wireless device performs the uplink control channel transmission in the serving cell using the selected uplink control channel for-
(Continued)

mat. A wireless device for performing an uplink control channel transmission in a serving cell in a wireless communications network is also provided.

16 Claims, 5 Drawing Sheets

Related U.S. Application Data continuation of application No. 15/101,546, filed as application No. PCT/SE2016/050281 on Apr. 5, 2016, now Pat. No. 10,284,329.

(60) Provisional application No. 62/145,538, filed on Apr. 10, 2015.

(51) Int. Cl.
*H04W 72/04* (2009.01)
*H04W 76/27* (2018.01)
*H04W 72/0453* (2023.01)
*H04L 27/26* (2006.01)

(52) U.S. Cl.
CPC ... *H04W 72/0413* (2013.01); *H04W 72/0453* (2013.01); *H04L 27/2601* (2013.01); *H04W 76/27* (2018.02)

(56) References Cited

U.S. PATENT DOCUMENTS

| | | | |
|---|---|---|---|
| 9,277,543 B2 | 3/2016 | Aiba et al. | |
| 10,129,901 B2 | 11/2018 | Suzuki et al. | |
| 10,284,329 B2 | 5/2019 | Bergström et al. | |
| 2011/0134774 A1 | 6/2011 | Pelletier et al. | |
| 2011/0286391 A1 | 11/2011 | Chen et al. | |
| 2012/0113827 A1* | 5/2012 | Yamada | H04L 1/1861 370/252 |
| 2012/0113944 A1 | 5/2012 | Yang et al. | |
| 2013/0077514 A1 | 3/2013 | Dinan | |
| 2013/0188618 A1* | 7/2013 | Dinan | H04L 5/0094 370/336 |
| 2013/0301439 A1* | 11/2013 | Heo | H04W 36/16 370/332 |
| 2013/0315113 A1* | 11/2013 | Seo | H04L 5/0098 370/280 |
| 2013/0329688 A1 | 12/2013 | Yang et al. | |
| 2013/0343239 A1 | 12/2013 | Damnjanovic et al. | |
| 2014/0161060 A1 | 6/2014 | Nam et al. | |
| 2014/0169238 A1 | 6/2014 | Cai et al. | |
| 2014/0241295 A1* | 8/2014 | Tang | H04L 1/0029 370/329 |
| 2014/0269600 A1 | 9/2014 | Lee et al. | |
| 2014/0307694 A1 | 10/2014 | Zeng et al. | |
| 2015/0079981 A1* | 3/2015 | Zhu | H04W 24/08 455/434 |
| 2015/0085714 A1 | 3/2015 | Liang et al. | |
| 2015/0215079 A1* | 7/2015 | Park | H04L 5/0055 370/280 |
| 2015/0223230 A1 | 8/2015 | Liang et al. | |
| 2015/0312947 A1* | 10/2015 | Park | H04L 5/0098 370/329 |
| 2016/0044744 A1* | 2/2016 | Lee | H04W 16/32 370/329 |
| 2016/0056939 A1* | 2/2016 | Kim | H04L 5/0053 370/331 |
| 2016/0212734 A1* | 7/2016 | He | H04L 5/14 |
| 2016/0270071 A1* | 9/2016 | Dinan | H04L 1/1854 |
| 2017/0134117 A1 | 5/2017 | Bergstrom et al. | |

OTHER PUBLICATIONS

Author Unknown, "Technical Specification Group Radio Access Network; Evolved Universal Terrestrial Radio Access (E-UTRA); Medium Access Control (MAC) protocol specification (Release 10)," Technical Specification 36.321, Version 10.10.0, 3GPP Organizational Partners, Dec. 2013, 55 pages.
CATT, "R2-096502: Carrier activation and de-activation," 3rd Generation Partnership Project (3GPP), TSG-RAN WG2 #68, Nov. 9-13, 2009, 3 pages, Jeju, Korea.
Non-Final Office Action for U.S. Appl. No. 15/101,546, dated Mar. 26, 2018, 20 pages.
Final Office Action for U.S. Appl. No. 15/101,546, dated Aug. 16, 2018, 27 pages.
Advisory Action and Examiner-Initiated Interview Summary for U.S. Appl. No. 15/101,546, dated Dec. 13, 2018, 7 pages.
Notice of Allowance and Examiner-Initiated Interview Summary for U.S. Appl. No. 15/101,546, dated Jan. 7, 2019, 18 pages.
Extended European Search Report for European Patent Application No. 1677699.8, dated Feb. 15, 2019, 9 pages.
First Official Action and Search Report for Russian Patent Application No. 2017138923/07, dated Apr. 5, 2018, 10 pages.
International Search Report and Written Opinion for International Patent Application No. PCT/SE2016/050281, dated May 31, 2016, 18 pages.
International Preliminary Report on Patentability for International Patent Application No. PCT/SE2016/050281, dated Oct. 10, 2017, 6 pages.
Notification of Reason for Refusal for Korean Patent Application No. 10-2017-7031977, dated Jun. 25, 2019, 19 pages.
Extended European Search Report for European Patent Application No. 19186057.6, dated Aug. 13, 2019, 7 pages.
Notice of Final Rejection for Korean Patent Application No. 10-2017-7031977, dated Dec. 11, 2019, 7 pages.
Non-Final Office Action for U.S. Appl. No. 16/374,497, dated Aug. 7, 2019, 9 pages.
Notice of Allowance and Examiner-Initiated Interview Summary for U.S. Appl. No. 16/374,497, dated Mar. 13, 2020, 17 pages.

* cited by examiner

WIRELESS DEVICE, A NETWORK NODE AND METHODS THEREIN FOR ENABLING AND PERFORMING AN UPLINK CONTROL CHANNEL TRANSMISSION

RELATED APPLICATIONS

This application is a continuation of U.S. patent application Ser. No. 16/374,497, filed Apr. 3, 2019, which is a continuation of U.S. patent application Ser. No. 15/101,546, filed Jun. 3, 2016, now U.S. Pat. No. 10,284,329, which is a 35 U.S.C. § 371 national phase filing of International Application No. PCT/SE2016/050281, filed Apr. 5, 2016, which claims the benefit of U.S. Provisional Application No. 62/145,538, filed Apr. 10, 2015, the disclosures of which are incorporated herein by reference in their entireties.

TECHNICAL FIELD

Embodiments herein relate to uplink control channel transmissions in a wireless communications network. In particular, embodiments herein relate to a wireless device and a method therein for performing an uplink control channel transmission in a serving cell in a wireless communications network. Also, embodiments herein relate to a network node and a method therein for enabling an uplink control channel transmission by a wireless device in a serving cell in a wireless communications network.

BACKGROUND

In today's wireless communications networks a number of different technologies are used, such as Long Term Evolution (LTE), LTE-Advanced, Wideband Code Division Multiple Access (WCDMA), Global System for Mobile communications/Enhanced Data rate for GSM Evolution (GSM/EDGE), Worldwide Interoperability for Microwave Access (WiMax), or Ultra Mobile Broadband (UMB), just to mention a few possible technologies for radio communication. A wireless communications network comprises network nodes, i.e. base stations or radio base stations, providing radio coverage over at least one respective geographical area forming a cell. The cell definition may also incorporate frequency bands used for transmissions, which means that two different cells may cover the same geographical area but using different frequency bands. Wireless devices, also known as mobile stations, terminals, and/or User Equipment, UEs, are served in the cells by the respective network node and are communicating with respective network node. The wireless devices transmit data over an air or radio interface to the network nodes in uplink, UL, transmissions and the network nodes transmit data over an air or radio interface to the wireless devices in downlink, DL, transmissions.

Long Term Evolution, LTE, is a project within the 3rd Generation Partnership Project, 3GPP, to evolve the WCDMA standard. LTE provides advantages such as increased capacity, higher data peak rates and significantly improved latency. For example, the LTE specifications support downlink data peak rates up to 300 Mbps, uplink data peak rates of up to 75 Mbit/s and radio access network round-trip times of less than 10 ms. In addition, LTE supports scalable carrier bandwidths from 20 MHz down to 1.4 MHz and supports both Frequency Division Duplex, FDD, and Time Division Duplex, TDD, operation.

LTE is a Frequency Division Multiplexing technology wherein Orthogonal Frequency Division Multiplexing, OFDM, is used in a DL transmission from a network node to a wireless device. Single Carrier-Frequency Domain Multiple Access, SC-FDMA, is used in an UL transmission from the wireless device to the network node. Services in LTE are supported in the packet switched domain. The SC-FDMA used in the UL is also referred to as Discrete Fourier Transform Spread, DFTS-OFDM.

Figure 1:
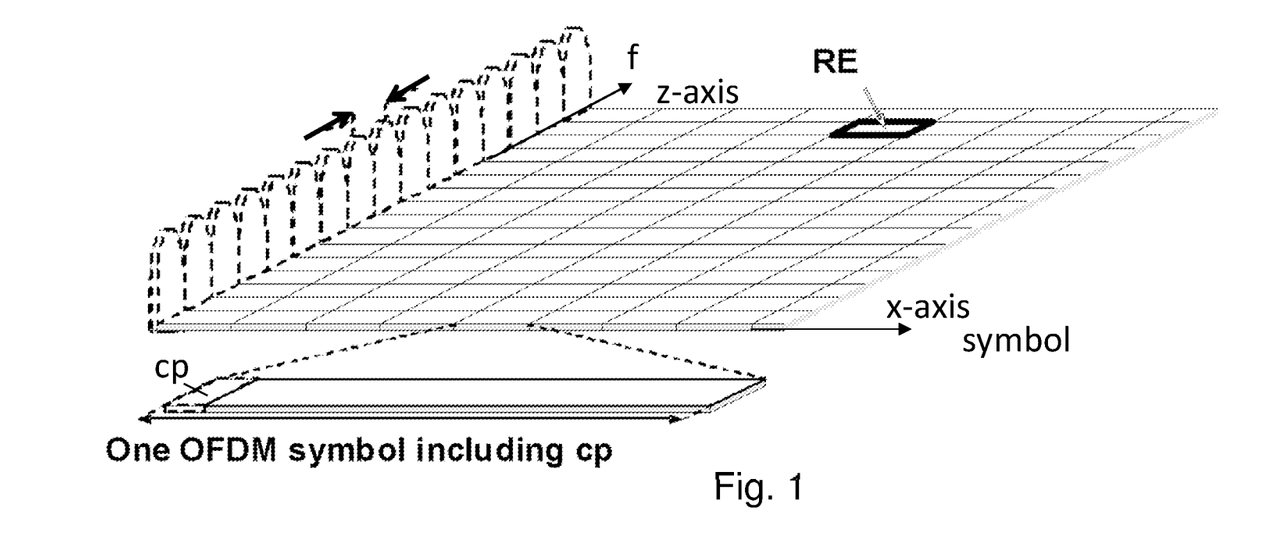
FIG. 1 is a schematic block diagram of a LTE downlink physical resource.

The basic LTE downlink physical resource may thus be seen as a time-frequency grid as illustrated in FIG. 1, where each Resource Element, RE, corresponds to one OFDM subcarrier during one OFDM symbol interval. A symbol interval comprises a cyclic prefix, cp, which cp is a prefixing of a symbol with a repetition of the end of the symbol to act as a guard band between symbols and/or facilitate frequency domain processing. Frequencies f or subcarriers having a subcarrier spacing $\Delta f$ are defined along an z-axis and symbols are defined along an x-axis.

Figure 2:
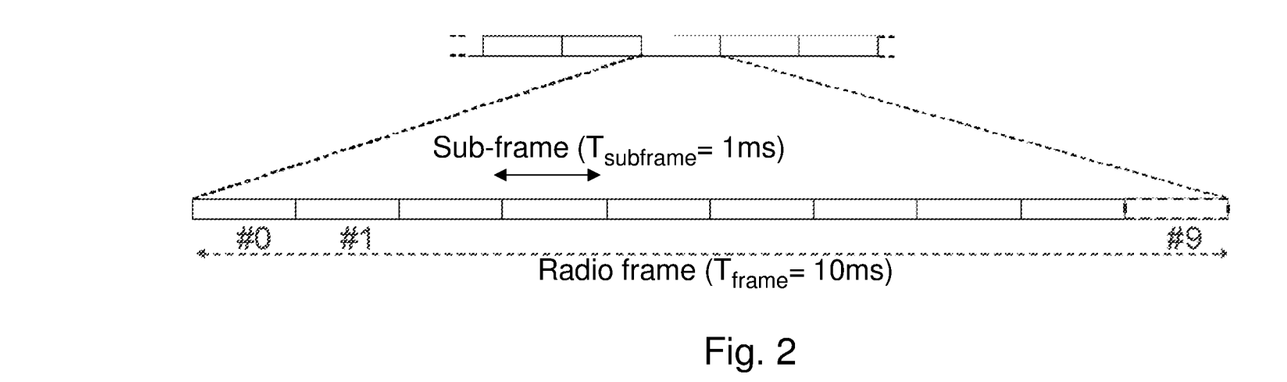
FIG. 2 is a schematic overview depicting radio frames.

In the time domain, LTE downlink transmissions are organized into radio frames of 10 ms, each radio frame comprising ten equally-sized subframes, #0-#9, each with a $T_{subframe}=1$ ms of length in time as shown in FIG. 2. Furthermore, the resource allocation in LTE is typically described in terms of resource blocks, where a resource block corresponds to one slot of 0.5 ms in the time domain and 12 subcarriers in the frequency domain. Resource blocks are numbered in the frequency domain, starting with resource block 0 from one end of the system bandwidth.

DL and UL transmissions are dynamically scheduled. For example, in each DL subframe, the network node transmits control information about to or from which wireless device data is transmitted and upon which resource blocks the data is transmitted. The control information for a given wireless device is transmitted using one or multiple Physical Downlink Control Channels, PDCCH. Control information of a PDCCH is transmitted in the control region comprising the first n=1, 2, 3 or 4 OFDM symbols in each subframe, where n is the Control Format Indicator, CFI. Typically the control region may comprise many PDCCHs carrying control information to multiple wireless devices simultaneously. Similarly, in each uplink subframe, the wireless device may transmit control information using one or multiple Physical Uplink Control Channels, PUCCHs.

Carrier Aggregation

Figure 3:
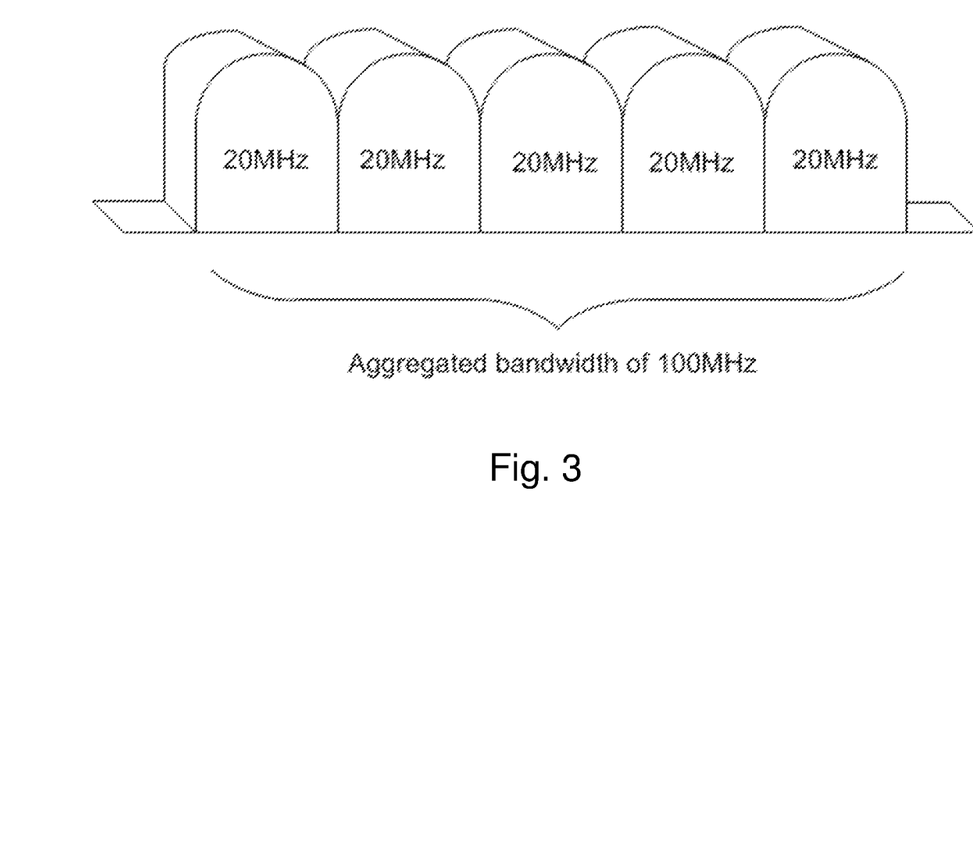
FIG. 3 is a schematic block diagram illustrating carrier aggregation.

In LTE Release 10 standard, a Component Carrier, CC, bandwidth of up to 20 MHz is supported. This is the maximal carrier bandwidth for the earlier LTE Release 8 standard. Hence, an LTE Release 10 operation that is wider than 20 MHz is possible. To a wireless device of LTE Release 10 standard, this may appear as a number of LTE carriers. However, it may also be advantageous to assure that an efficient use of a wide carrier is also performed for legacy wireless devices, i.e. where legacy wireless devices may be scheduled in all parts of the wideband LTE Release 10 carrier. One way to do is by means of Carrier Aggregation, CA, as shown in FIG. 3. In the LTE Release 10 standard, up to 5 aggregated carriers is supported. Each carrier is limited in the Radio Frequency, RF, specifications to have one out of six bandwidths, namely, 6, 15, 25, 50, 75 or 100 RBs. These correspond to 1.4, 3, 5, 10, 15 and 20 MHz, respectively.

The number of aggregated CCs, as well as, the bandwidth of the individual CC may be different for UL and DL. A symmetric configuration refers to the case where the number of CCs in DL and UL are the same. An asymmetric configuration refers to the case where the number of CCs in DL and UL are different. Note that the number of CCs configured in the network node may be different from the number of CCs as seen by a wireless device. For example, a wireless device may support more DL CCs than UL CCs, even though the network node offers the same number of UL CCs and DL CCs. CCs may also be referred to as cells or serving cells.

Particularly, in an LTE network, the CCs aggregated by a wireless device may be denoted Primary Cell, PCell, and Secondary Cells, SCells. The term "serving cell" may comprise both a PCell and SCells. The PCell is wireless device specific and may be viewed as "more important". That is because vital control signalling and other important signalling is typically handled via the PCell. The CC configured as the PCell is the primary CC, whereas all other CCs are secondary CCs.

During initial access a wireless device of LTE Release 10 standard acts similarly to a wireless device of LTE Release 8. For example, upon successful connection to the network a wireless device may, depending on its own capabilities and the networks capabilities, be configured with additional CCs in the UL and DL. This configuration may be based on Radio Resource Control, RRC, signalling. Because of heavy signalling and rather slow speed of the RRC signalling, a wireless device may be configured with multiple CCs, even though not all of the CCs are currently being used. If a wireless device is activated on multiple CCs, it follows that the wireless device has to monitor all DL CCs, e.g. for a Physical Downlink Control Channel, PDCCH, and Physical Downlink Shared Channel, PDSCH. This implies a wider receiver bandwidth, higher sampling rates, etc. This will result in higher power consumption by the wireless device.

SCell Activation and Deactivation

As mentioned, CA was introduced in LTE Release 10, and with that the concept of SCells, i.e. additional resources which could be activated or de-activated, i.e. configured or de-configured, when needed. Each SCell is configured with a SCellIndex, which is an identifier or a so-called Cell Index that is unique among all serving cells configured for a particular wireless device. The PCell always have Cell Index 0 and SCell may have a integer cell index of 1 to 7.

In LTE Release 8/9/10 standard, the network node and the wireless device use so called Medium Access, MAC, Control Elements, CEs, to exchange information, such as, for example, buffer status reports, power headroom reports, activation commands, etc. One of the areas where MAC CEs are used is for activation and de-activation of SCells. For example, an Activation/De-activation MAC CE is defined in section 6.1.3.8 in Release 10 of the LTE standard specification 3GPP TS 36.321. Here, the Activation/De-activation MAC CE comprises a single octet containing seven C-fields and one R-field. Each C-field corresponds to a specific SCellIndex and indicates whether the specific SCell is activated or de-activated. The wireless device will ignore all C-fields associated with cell indices not being configured. The Activation/De-activation MAC CE always indicates the activation status of all configured SCells, meaning that if the network node wants to activate a SCell it has to include all configured SCells, setting them to activated or de-activated even if their status has not changed.

PUCCH Formats in LTE

In LTE Release 8 standard, PUCCH format 1/1a/1b and PUCCH format 2/2a/2b are supported for Scheduling Request, SR, Hybrid Automatic Repeat reQuest acknowledgement, HARQ-A/N, and periodic Channel State Information, CSI, reporting. The PUCCH resource is represented by a single scalar index, from which the phase rotation and the orthogonal cover sequence (only for PUCCH format 1/1a/1b) are derived. The use of a phase rotation of a cell-specific sequence together with orthogonal sequences provides orthogonally between different wireless devices in the same cell transmitting PUCCH on the same set of RBs.

In LTE Release 10 standard, PUCCH format 3 was introduced for CA for FDD and TDD, when there are multiple downlink transmissions, e.g. either on multiple carriers or multiple downlink subframes, but single uplink, e.g. either single carrier or single uplink subframe, for SR, HARQ-ACK, and/or CSI feedback. Similar to the other PUCCH formats, the PUCCH format 3 resource is also represented by a single scalar index from which the orthogonal sequence and the resource-block number may be derived. A length-5 orthogonal sequence is applied for PUCCH format 3 to support code multiplexing within one RB pair and a length-4 orthogonal sequence is applied for a shortened PUCCH. The PUCCH format 3 resource is determined according to higher layer configuration and a dynamic indication from the DL assignment. In detail, the Transmit Power Control, TPC, field in the Downlink Control Information, DCI, format of the corresponding PDCCH/EPDCCH is used to determine the PUCCH resource values from one of the four resource values configured by higher layers. For FDD, the TPC field corresponds to the PDCCH/EPDCCH for the scheduled secondary Scells. For TDD, the TPC field corresponds to the PDCCH/EPDCCH for the PCell with Downlink Assignment Index, DAI, value in the PDCCH/EPDCCH larger than '1'. A wireless device shall assume that the same PUCCH resource values are transmitted in each DCI format of the corresponding PDCCH/EPDCCH assignments.

In 3GPP, up to the Release 12 standard, the maximum number of downlink component carriers is 5. For HARQ-ACK feedback, PUCCH format 1b with channel selection and PUCCH format 3 have enough capability to feedback the HARQ-ACK for all configured carriers. However, in Release 13 standard, maximum 32 downlink carriers may be configured for one wireless device and hence at least one new PUCCH format will be introduced to carry more HARQ-ACK bits due to the aggregation of 32 DL CCs.

SUMMARY

It is an object of embodiments herein to improve uplink control channel transmissions in a wireless communications network.

According to a first aspect of embodiments herein, the object is achieved by a method performed by a wireless device for performing an uplink control channel transmission in a serving cell in a wireless communications network when the wireless device is configured with a set of serving cell(s) in the wireless communications network. The wireless device determines a number of serving cells of the set of serving cell(s) that are relevant to consider when performing the uplink control channel transmission in the serving cell. Also, the wireless device selects an uplink control channel format from a set of uplink control channel formats for uplink control channel transmissions based on the determined number of serving cells. Further, the wireless device performs the uplink control channel transmission in the serving cell using the selected uplink control channel format.

According to a second aspect of embodiments herein, the object is achieved by a wireless device for performing an uplink control channel transmission in a serving cell in a wireless communications network when the wireless device is configured with a set of serving cell(s) in the wireless communications network. The wireless device is configured to determine a number of serving cells of the set of serving cell(s) that are relevant to consider when performing the uplink control channel transmission in the serving cell, select an uplink control channel format from a set of uplink control channel formats for uplink control channel transmissions based on the determined number of serving cells, and perform the uplink control channel transmission in the serving cell using the selected uplink control channel format.

According to a third aspect of embodiments herein, the object is achieved by a method performed by a network node for enabling an uplink control channel transmission by a wireless device in a serving cell in a wireless communications network when the wireless device is configured with a set of serving cell(s) in the wireless communications network. The network node determines a set of uplink control channel formats for uplink control channel transmissions for the wireless device. Also, the network node transmits information indicating the determined set of uplink control channel formats for uplink control channel transmissions for the wireless device to the wireless device.

According to a fourth aspect of embodiments herein, the object is achieved by a network node for enabling an uplink control channel transmission by a wireless device in a serving cell in a wireless communications network when the wireless device is configured with a set of serving cell(s) in the wireless communications network. The network node is configured to determine a set of uplink control channel formats for uplink control channel transmissions for the wireless device, and to transmit information indicating the determined set of uplink control channel formats for uplink control channel transmissions for the wireless device to the wireless device.

According to a fifth aspect of embodiments herein, the object is achieved by a computer program, comprising instructions which, when executed on at least one processor, cause the at least one processor to carry out the method described above. According to a sixth aspect of embodiments herein, the object is achieved by a carrier containing the computer program described above, wherein the carrier is one of an electronic signal, optical signal, radio signal, or computer readable storage medium.

By determining a number of serving cells that are relevant to consider when performing an uplink control channel transmission, selecting an uplink control channel format based on the determined number of serving cells, and performing the uplink control channel transmission using the selected uplink control channel format, the wireless device may suitably select an uplink control channel format for the uplink control channel transmission in view of a relevant number of serving cells so as to avoid unnecessary control signalling overhead in the wireless communication network. This is because an unsuitable uplink control channel format for the uplink control channel transmission in view of the serving cells will result in unnecessary control signalling overhead. Thus, the uplink control channel transmission in the wireless communications network is improved.

BRIEF DESCRIPTION OF THE DRAWINGS

Features and advantages of the embodiments will become readily apparent to those skilled in the art by the following detailed description of exemplary embodiments thereof with reference to the accompanying drawings, wherein.

DETAILED DESCRIPTION

The figures are schematic and simplified for clarity, and they merely show details which are essential to the understanding of the embodiments presented herein, while other details have been left out. Throughout, the same reference numerals are used for identical or corresponding parts or steps.

Figure 4:
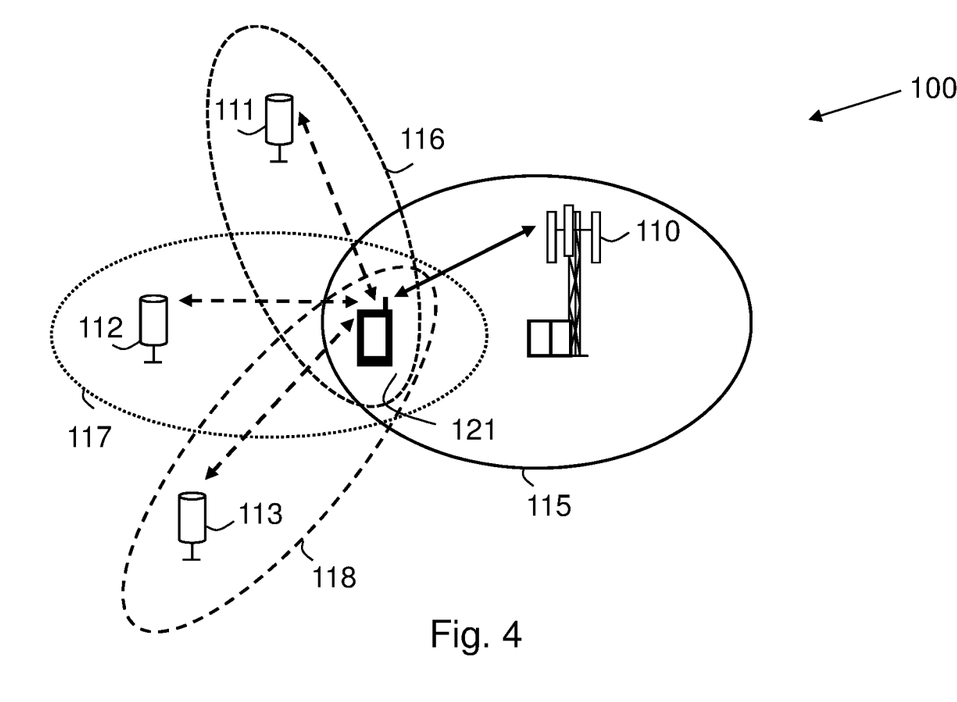
FIG. 4 is a schematic block diagram illustrating embodiments of a wireless device and a network node in a wireless communications network.

FIG. 4 shows an example of a wireless communications network 100 in which embodiments herein may be implemented. Although illustrated in FIG. 1 as an LTE network, the wireless communications network 100 may be any wireless or radio communication system, such as, LTE-Advanced, Wideband Code-Division Multiple Access (WCDMA), Global System for Mobile communications/Enhanced Data rate for GSM Evolution (GSM/EDGE), Worldwide Interoperability for Microwave Access (WiMax), Ultra Mobile Broadband (UMB) or GSM network, or other cellular network or system, such as, a future 5G wireless communication system.

The wireless communications network 100 comprises a first network node 110. The first network node 110 may e.g. be an eNB, eNodeB, or a Home Node B, a Home eNode B, femto Base Station (BS), pico BS or any other network unit capable to serve a wireless device in the wireless communications network 100. The first network node 110 may also be e.g. a radio base station, a base station controller, a network controller, a relay node, a repeater, an access point (AP), a radio access point, a wireless access point, an Ultra-Dense Network/Software-Defined Network (UDN/SDN) radio access node, a node in distributed antenna system (DAS), a Remote Radio Unit (RRU) or a Remote Radio Head (RRH). Furthermore, the first network node 110 may comprise multiple antennas for wireless radio communication with wireless devices located within their coverage range; that is, the first network node 110 may use one or more of its respective antennas to provide radio coverage within its cell 115.

In the example of FIG. 3, a wireless device 121 is located within the cell 115 and served by the first network node 110. The wireless device 121 may e.g. be any kind of wireless device such as a mobile phone, a cellular phone, a Personal Digital Assistant (PDA), a smart phone, a tablet, a sensor or actuator with wireless communication capabilities, a sensor or actuator connected to or equipped with a wireless device, a Machine Device (MD), a Machine-Type-Communication (MTC) device, a Machine-to-Machine (M2M) communication device, a Customer-Premises Equipment (CPE), a Laptop-Mounted Equipment (LME), a Laptop-Embedded Equipment (LEE), etc.

The wireless device 121 may also be served in the cells 116, 117, 118 in the wireless communications network 100, i.e. as secondary cells or SCells. Together with the primary cell or PCell, i.e. cell 115, these cells 116, 117, 118 may form or constitute the serving cells 115, 116, 117, 118 of the wireless device 121 in the wireless communications network 100.

In some embodiments, the cells 116, 117, 118 may be provided by a second, a third and a fourth network node 111, 112, 113. For example, as shown in the scenario depicted in FIG. 3, the second, third and fourth network node 111, 112, 113 may be RRUs or RRHs configured to communicate with, or be connected to, the network node 110. The second, third and fourth network node 111, 112, 113 may also be configured to be controlled by the network node 110. However, it should be noted that the cells 116, 117, 118 may also be provided and controlled by the network node 110 itself, e.g. using different frequency bands for each cell 116, 117, 118 and/or co-located antennas, etc. These embodiments are examples of when so-called intra-eNB carrier aggregation may be used. According to some embodiments, one or more of the second, third and fourth network node 111, 112, 113 may also, for example, be an eNB, eNodeB, or a Home Node B, a Home eNode B, femto Base Station (BS), pico BS or any other network unit capable to serve a wireless device in the wireless communications network 100. For example, the first network node 110 may provide and control the cells 115, 116, while another network node, e.g. the fourth network node 113 provide and control the cells 117, 118. Then, these embodiments are examples of when so-called inter-eNB carrier aggregation may be used.

Furthermore, although embodiments below are described with reference to the scenario of FIG. 3, this scenario should not be construed as limiting to the embodiments herein, but merely as an example made for illustrative purposes.

As part of the developing of the embodiments described herein, it has been noticed that the amount of control signalling sent in an uplink control channel transmission, e.g. control information sent on a PUCCH, by a wireless device may vary in time on the basis of the amount of serving cells that are activated. Thus, if only one uplink control channel format, e.g. PUCCH format, is configured for uplink control channel transmissions in the wireless device, then that one uplink control channel format may not be always be suitable in terms of resource utilization depending on the amount of serving cells that are actually activated at a certain time instant. Furthermore, simply changing the uplink control channel format t for uplink control channel transmissions for a wireless device based on how many serving cells are activated may however not be feasible. This is because activation or de-activation of the serving cells for a wireless device may quickly be made on the MAC level, while RRC signalling for changing the uplink control channel format for uplink control channel transmissions for a wireless device is typically significantly slower.

This issue is addressed by the embodiments presented herein by dynamically selecting, in the wireless device, the uplink control channel format used for an uplink control channel transmission to suit the current need of control signalling due to the number of serving cells without having excessive signalling or delays. This is performed by determining a number of serving cells that are relevant to consider when performing an uplink control channel transmission, selecting an uplink control channel format, e.g. a PUCCH format, based on the determined number of serving cells, and performing the uplink control channel transmission using the selected uplink control channel format. By selecting a suitable uplink control channel format this way, unnecessary signalling overhead may be avoided in the wireless communication network. This is because using an unsuitable uplink control channel format for the uplink control channel transmission will consume unnecessary control signalling overhead. In addition, with this dynamic uplink control channel format selection, the PUCCH resources may be efficiently utilized. Thus, the uplink control channel transmission in the wireless communications network is improved.

In other words, according to the embodiments herein, a wireless device may receive information indicating two or more PUCCH formats for a serving cell and the wireless device may select which PUCCH format to use based on the number of serving cells which it classifies as relevant to consider for a PUCCH transmission on the serving cell. When the wireless device has selected the PUCCH format, the wireless device will perform the PUCCH transmission using the selected PUCCH format.

Figure 5:
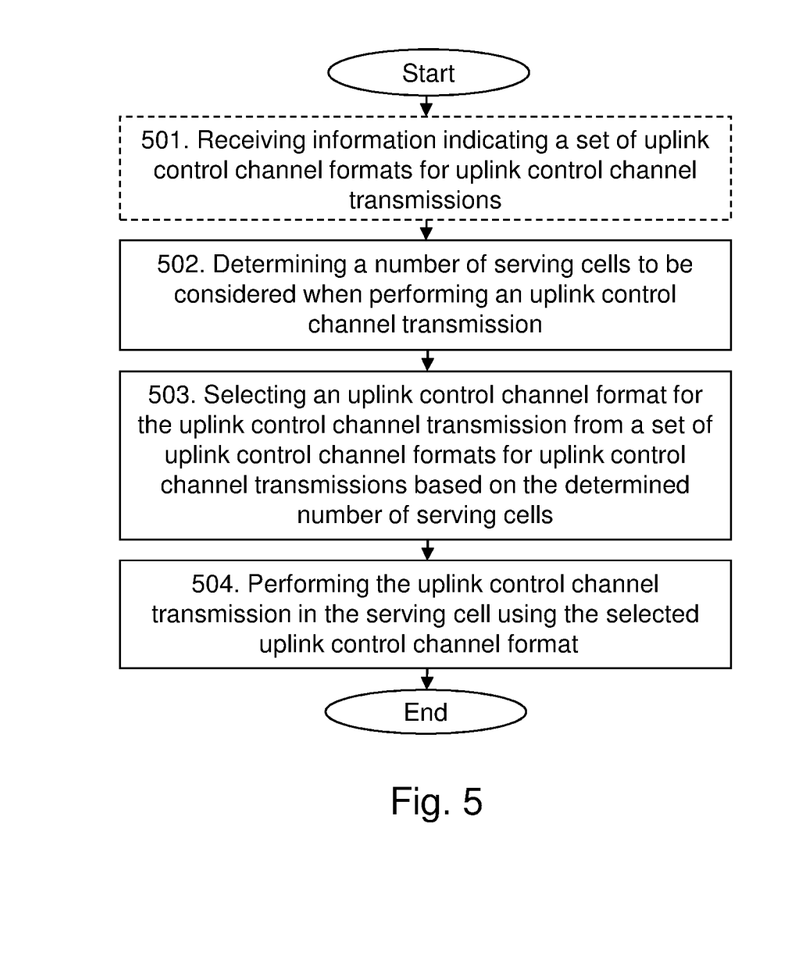
FIG. 5 is a flowchart depicting embodiments of a method in a network node.

Example of embodiments of a method performed by a wireless device 121 for performing an uplink control channel transmission in a serving cell 115 in a wireless communications network 100 when the wireless device 121 is configured with a set of serving cell(s) 115, 116, 117, 118 in the wireless communications network 100, will now be described with reference to the flowchart depicted in FIG. 5. FIG. 5 illustrates an example of actions or operations which may be taken by the wireless device 121. The method may comprise the following actions.

Action 501

Optionally, in some embodiments, the wireless device 121 may receive information indicating the set of uplink control channel formats for uplink control channel transmissions from a network node 110 in the wireless communications network 100. The different uplink control channel formats in the set of uplink control channel formats may be suitable to different number of serving cells that are relevant to the wireless device 121.

In some embodiments, the wireless device 121 may optionally also receive information indicating one or more criterions to be used by the wireless device 121 in determining a number of serving cells that are relevant to consider when performing uplink control channel transmissions in the serving cell 115. In some embodiments, the wireless device 121 may optionally also receive information indicating one or more threshold values to be used by the wireless device 121 when selecting an uplink control channel format from a set of uplink control channel formats based on the determined number of serving cells that are relevant to consider when performing uplink control channel transmissions in the serving cell 115. In some embodiments, the above information may be received by the wireless device 121 in one or more Radio Resource Control, RRC, messages.

Action 502

The wireless device 121 determines a number of serving cells of the set of serving cell(s) 115, 116, 117, 118 that are relevant to consider when performing the uplink control channel transmission in the serving cell 115.

According to some embodiment, multiple criterions are presented below which may be used when determining a number of serving cells that are relevant to consider when performing uplink control channel transmissions in the serving cell 115; in other words, whether to consider a serving cell or not. Which one or more of these multiple criterions that is used by the wireless device 121 may be configured by the network node 110 as described in Action 501, e.g. signalled to the wireless device 121 in an RRC message.

In some embodiments, the wireless device 121 may determine the number of serving cells that are relevant to consider when performing the uplink control channel transmission to be the number of serving cells in the set of serving cell(s) 115, 116, 117, 118 that are currently activated in the wireless device 121. In other words, serving cells may be classed as relevant based on their activation status, i.e. based on whether the serving cell is activated or deactivated. If the serving cell is activated the serving cell would be a cell to consider as relevant, otherwise if the serving cell is deactivated it would not be a cell to consider as relevant.

In a first example, assume the network node 110 has indicated the following activation command to the wireless device 121:
{Serving cell 115: Activated;
Serving cell 116: Activated;
Serving cell 117: De-activated;
Serving cell 118: De-activated}.

In this case, the wireless device 121 would then have two (2) serving cells that it considers relevant and two serving cells (2) which it does not consider relevant. In a second example, e.g. if the activation or de-activation status changes to the following:
{Serving cell 115: Activated;
Serving cell 116: Activated;
Serving cell 117: Activated;
Serving cell 118: Activated}.

That is, the serving cell 117 and the serving 118 will get activated. In this case, the wireless device 121 would then have four (4) serving cells that it considers relevant and no serving cells (0) which it does not consider relevant.

In some embodiments, the wireless device 121 may determine the number of serving cells that are relevant to consider when performing the uplink control channel transmission to be the number of serving cells in the set of serving cell(s) 115, 116, 117, 118 that have been indicated to be activated by a network node 110 in the wireless communications network 100. In other words, serving cells may be classed as relevant based on their activation status as determined by the network node 110.

This may be advantageous since, while conventionally activation and de-activation of serving cells for a wireless device 121 is controlled by the network node 110 by using Activation/De-activation MAC CEs, there may also be a mechanism in the wireless device 121 which makes the wireless device 121 autonomously de-activate a serving cell if the wireless device 121 has not been scheduled on the serving cell for a certain predetermined or configured time period or time duration. For example, the wireless device 121 may be configured to de-activate a serving cell which it has not been scheduled on for the past two (2) seconds. To do this, the wireless device 121 may maintain a timer for each serving cell, except its PCell, i.e. cell 115 in the example of FIG. 4. The timer for a serving cell may be restarted every time the wireless device 121 is scheduled on the serving cell. If the timer for a serving cell expires, then the wireless device 121 may de-activate the serving cell.

Because of the fact that scheduling grants and assignments from the network node 110 may get lost, there may be times when there is a mismatch between when the network node 110 expects the wireless device 121 to autonomously de-activate a serving cell and when the wireless device 121 actually will de-activate a serving cell. This may, for example, occur when the network node 110 schedules the wireless device 121 on a serving cell and expects the wireless device 121 to keep the serving cell activated for another two seconds, i.e. its configured period of time, but when the wireless device 121 has actually missed the scheduling grant or assignment from the network node 110 and thus will de-activate the serving cell earlier than expected by the network node 110. Furthermore, if the wireless device 121 were to change the uplink control channel format, e.g. the PUCCH format, when a serving cell gets de-activated by its respective timer in the wireless device 121, then the network node 11 0 may not be prepared for the wireless device 121 applying the new uplink control channel format and a mismatch may occur. Therefore, to improve robustness in the wireless communications network 100, the wireless device 121 may only select the uplink control channel format, e.g. PUCCH format, based on activation/de-activation MAC CEs from the network node 110, i.e. the number of serving cells in the set of serving cell(s) 115, 116, 117, 118 that have been indicated to be activated by a network node 110 in the wireless communications network 100. In other words, the wireless device 121 will in these embodiments not change the uplink control channel format if the wireless device 121 has autonomously de-activated a serving cell based on the timer.

In some embodiments, the wireless device 121 may determine the number of serving cells that are relevant to consider when performing the uplink control channel transmission to be the number of serving cells in the set of serving cell(s) 115, 116, 117, 118 that have been added, or configured, for the wireless device 121 by a network node 110 in the wireless communications network 100. In other words, serving cells may be classed as relevant based on whether the serving cell is currently added or not. In this case, only if the serving cell has been added for the wireless device 121 it will be deemed relevant, otherwise it will not be deemed relevant.

It should be noted here that the terms "configured" or "de-configured" may be used interchangeably herein with the terms "added" or "removed". This is because in the RRC specification wherein the procedure of configuration and de-configuration is described, it is sometimes said that cells are added instead of configured and removed instead of de-configured. However, their inherent meaning is the same.

One advantage of these embodiments is that the configuration or de-configuration status is fully controlled by the network node 110 and thus there is no risk of a mismatch between the understanding of the wireless device 121 of the number of configured cells for the wireless device 121 and the understanding of the network node 110 of the number of configured cells for the wireless device 121. Hence, there is no risk for a mismatched uplink control channel format, e.g. the PUCCH format, between the wireless device 121 and network node 110.

In some embodiments, the wireless device 121 may determine the number of serving cells that are relevant to consider when performing the uplink control channel transmission to be the number of serving cells in the set of serving cell(s) 115, 116, 117, 118 that the wireless device 121 have been scheduled on. In other words, a serving cell may be classed as relevant based on whether the wireless device 121 has been scheduled on the serving cell or not. In some embodiments, the wireless device 121 may determine whether the wireless device 121 has been scheduled on the serving cell or not based on one or more of a received DL assignment from the network node 110, a semi-persistent scheduling configuration, and/or a dynamic scheduling signalling from the network node 110. Alternatively, according to some embodiments, the wireless device 121 may determine the number of serving cells that are relevant to consider when performing the uplink control channel transmission to be the number of serving cells in the set of serving cell(s) 115, 116, 117, 118 that the wireless device 121 have been scheduled on within a determined period of time. This provides another possible way for the wireless device 121 to determine whether the wireless device 121 has been scheduled, e.g. by only considering a certain configured time period. This may advantageously ensure that even if the wireless device 121 misses or drops a scheduling grant or scheduling assignment, the wireless device 121 will not change the relevance of the serving cell directly. This is beneficial to avoid a mismatch between which uplink control channel format, e.g. the PUCCH format, the network node 110 expects the wireless device 121 to use and the uplink control channel format the wireless device 121 is actually using, when a large number of scheduling grants/assignment in a row gets lost. In fact, if this really should happen, then the network node 110 would anyway detect that some problem has occurred and may take action, such as, e.g. de-activating the serving cells for the wireless device 121. Another advantage of this way of determining whether or not a serving cell is relevant or not in the wireless device 121 is that the uplink control channel format will be changed dynamically so that the optimal uplink control channel format is always selected based on how many serving cells are scheduled. Here, it should also be noted that the number of bits required to transmit a control channel transmission, such as, a PUCCH transmission, depends on the number of serving cells the transmission carries information for. This means that the more serving cells a control channel transmission carries information for, the more bits are needed for the control channel transmission. For example, to transmit a PUCCH transmission comprising information regarding 1 serving cell may be in the order of 4 bits, while a PUCCH transmission comprising information regarding 5 serving cells may be in the order of 20 bits.

In some embodiments, the wireless device 121 may determine the number of serving cells that are relevant to consider when performing the uplink control channel transmission to be the serving cell 115 in which the uplink control channel transmission is to be performed and one or more serving cells 116, 117, 118 that are mapped to the serving cell 115 in which the uplink control channel transmission is to be performed. In other words, serving cells may be classed as relevant based on mapping of uplink control channels, e.g. a PUCCH mapping.

As proposed in 3GPP, the network node 110 may configure and provide a mapping, i.e. information linking together, between each of the serving cells of the wireless device 121 and uplink control channel format, such as, e.g. PUCCHs. For example, assume that the wireless device 121 is configured with serving cells 115, 116, 117, 118, but that a PUCCH is only configured for the serving cells 115, 117. In this case, the serving cells 116, 118 may comprise a mapping to PUCCHs of the serving cells 115, 117, respectively, as shown below:

Serving cell 115: PUCCH configured→Mapped to itself;
Serving cell 116: No PUCCH configured→Mapped to serving cell 115;
Serving cell 117: PUCCH configured→Mapped to itself;
Serving cell 118: No PUCCH configured→Mapped to serving cell 115.

In this case, it may thus be irrelevant whether the serving cells 117, 118 are active, configured, and/or scheduled when selecting the PUCCH format for serving cell 115, e.g. such as described in Action 503. Therefore, the wireless device 121 may here only take in to account the serving cells which are mapped to the serving cell in which the uplink control channel transmission is to be performed. For example, serving cell 116 when performing the uplink control channel transmission in the serving cell 115, or serving cell 118 when performing the uplink control channel transmission in the serving cell 117. In other words, the serving cells 115, 116 are irrelevant when selecting the PUCCH format for the serving cell 117, since the serving cells 115, 116 are not mapped to serving cell 117. And likewise, the serving cells 117, 118 are irrelevant when selecting PUCCH format for the serving cell 115 since the serving cells 117, 118 are not mapped to the serving cell 115.

It should also be noted that any of the above mentioned embodiments for determining which of the serving cells 115, 116, 117, 118 that may be classed as relevant to consider when performing uplink control channel transmissions in the serving cell 115 may be combined in various ways, e.g. the serving cells may be classed as relevant based on a combination of activation status, configuration status and scheduling status. For example, if the PUCCH format is to be selected for the serving cell 115, then the wireless device 121 may select the PUCCH format for the serving cell 115 based on e.g. the number of activated serving cells which are mapped to the serving cell 115. Alternatively, the wireless device 121 may select the PUCCH format for the serving cell 115 based on e.g. the number of configured serving cells which are mapped to the serving cell 115 or the number of scheduled serving cells which are mapped to the serving cell 115.

Action 503

After determining the number of serving cells in Action 502, the wireless device 121 selects an uplink control channel format from a set of uplink control channel formats for uplink control channel transmissions based on the determined number of serving cells.

In some embodiments, the uplink control channel format for the uplink control channel transmission is selected from the set of uplink control channel formats based on one or more threshold values for the determined number of serving cells. As described in Action 501, these may be provided by the network node 110.

When the wireless device 121 selects the uplink control channel format, i.e. the PUCCH format, for the uplink control channel transmissions in the serving cell 115, the wireless device 121 will use the determined number of serving cells as described in the previous Action 502, i.e. the number of serving cells that are relevant to consider when performing the uplink control channel transmission in the serving cell 115. For example, if the determined number of serving cells is higher than a threshold value, then the wireless device 121 may select one PUCCH format from the set of uplink control channel formats, otherwise the wireless device 121 may select another PUCCH format from the set of uplink control channel formats. According to another example, if the threshold value for selecting a certain PUCCH format is five (5) serving cells, then the wireless device 121 may select this PUCCH format only if the determined number of serving cells indicates up to five (5) serving cells, otherwise the wireless device 121 may select another PUCCH format.

It should be noted that this is also applicable for more than one threshold value and more than two PUCCH formats. For example, in case the wireless device 121 has a set of uplink control channel formats comprising three (3) possible PUCCH formats, the wireless device 121 may also apply threshold values such that: a first PUCCH format is selected when the determined number of serving cells is less than X number of serving cells, a second PUCCH format is selected when the determined number of serving cells is between X+1 and Y number of serving cells, and a third PUCCH format is selected when the determined number of serving cells is higher than Y+1 number of serving cells. X and Y here being real numbers.

In some embodiments, the uplink control channel format for the uplink control channel transmission is selected from the set of uplink control channel formats further based on the existence of and/or the length of a periodic Channel State Information, CSI, in the wireless device 121. This means that the wireless device 121 may select, for example, a PUCCH format, based on the determined number of serving cells, as well as, the existence and/or the length of periodic CSI.

For example, if the number of determined number of serving cells is below a threshold value, and there is no periodic CSI, then the wireless device 121 may select one PUCCH format; otherwise, i.e. in case there is a periodic CSI, the wireless device 12 may select another PUCCH format. According to another example, if the number of determined serving cells is below a threshold value, and the number of P-CSI bits is also below a threshold value, then the wireless device 121 may select one PUCCH format; otherwise, i.e. in case the number of P-CSI bits is above a threshold value, the wireless device 12 may select another PUCCH format.

Action 504

The wireless device 121 then performs the uplink control channel transmission in the serving cell 115 using the selected uplink control channel format.

In some embodiments, the uplink control channel transmission in the serving cell 115 using the selected uplink control channel format is performed according to one or more of the following: at the beginning of the next subsequent subframe in the wireless communications network 100; at the beginning of the next subsequent radio frame in the wireless communications network 100; according to information received from a network node 110 in the wireless communications network 100, e.g. in a MAC message wherein the MAC message indicates that the wireless device 121 should perform a reselection of the PUCCH format; upon or after the expiry of a timer for switching the uplink control channel format for uplink control channel transmissions; and at a fixed or predetermined time instant. This means that the time for switching the uplink control channel format, e.g. the PUCCH format, may be suitably performed at different points in time depending on implementation.

One advantage of changing the uplink control channel format, e.g. the PUCCH format, after a certain time period instead of directly, e.g. directly when a criterion suggests so, is that for some selection criterions the PUCCH format may beneficially be changed quickly and for some selection criterions may be prone to mismatch between the selected PUCCH format by the wireless device 121 and the PUCCH format which the network node 110 is expecting the wireless device 121 to apply. For example, if the wireless device 121 is applying the selection based on scheduled cells, the wireless device 121 may miss a scheduling grant and/or scheduling assignment and in this case, apply a PUCCH format with room for fewer serving cells than the network node 110 expects the wireless device 121 to apply.

In some embodiments, the uplink control channel transmission in the serving cell 115 using the selected uplink control channel format is performed based on the configuration of the serving cell 115. This means that the time for switching the uplink control channel format, e.g. the PUCCH format, may depend on the configuration of the serving cell 115 on which the PUCCH is to be transmitted, such as, e.g. the time instant for switching the PUCCH format may be different for PUCCH on a FDD cell and on a TDD cell.

Figure 6:
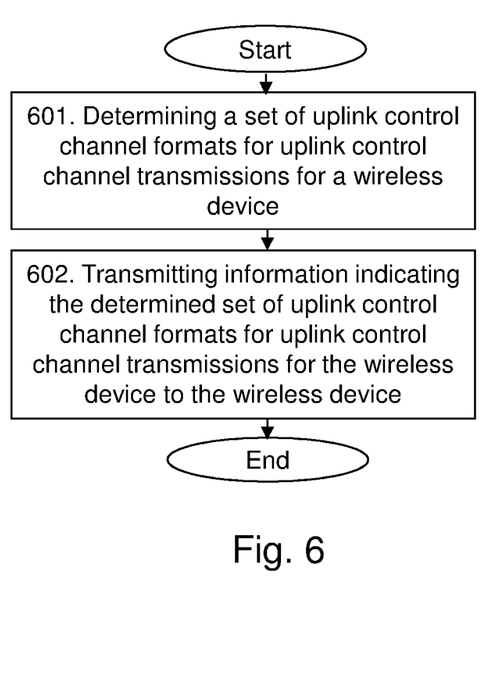
FIG. 6 is a flowchart depicting embodiments of a method in a wireless device.

Example of embodiments of a method performed by a network node 110 for enabling an uplink control channel transmission by a wireless device 121 in a serving cell 115 in a wireless communications network 100 when the wireless device 121 is configured with a set of serving cell(s) 115, 116, 117, 118 in the wireless communications network 100, will now be described with reference to the flowchart depicted in FIG. 6. FIG. 6 illustrates an example of actions or operations which may be taken by the network node 110. The method may comprise the following actions.

Action 601

The network node 110 determines a set of uplink control channel formats for uplink control channel transmissions for the wireless device 121. The different uplink control channel formats in the set of uplink control channel formats may be suitable to different amount of serving cells that are relevant to the wireless device 121.

In some embodiments, the network node 110 may also determine one or more criterions to be used by the wireless device 121 in determining a number of serving cells that are relevant to consider when performing uplink control channel transmissions in the serving cell 115. In some embodiments, the network node 110 may further determine one or more threshold values to be used by the wireless device 121 when selecting an uplink control channel format from the set of uplink control channel formats based on the determined number of serving cells that are relevant to consider when performing uplink control channel transmissions in the serving cell 115.

Action 602

After the determination in Action 601, the network node 110 transmits information indicating the determined set of uplink control channel formats for uplink control channel transmissions for the wireless device 121 to the wireless device 121. In some embodiments, the network node 110 may also transmit information indicating the one or more criterions to the wireless device 121. In some embodiments, the network node 110 may further transmit information indicating the one or more threshold values to the wireless device 121. In some embodiments, the transmission of the information, described above in this Action 602, may be transmitted in one or more Radio Resource Control, RRC, messages.

Figure 7:
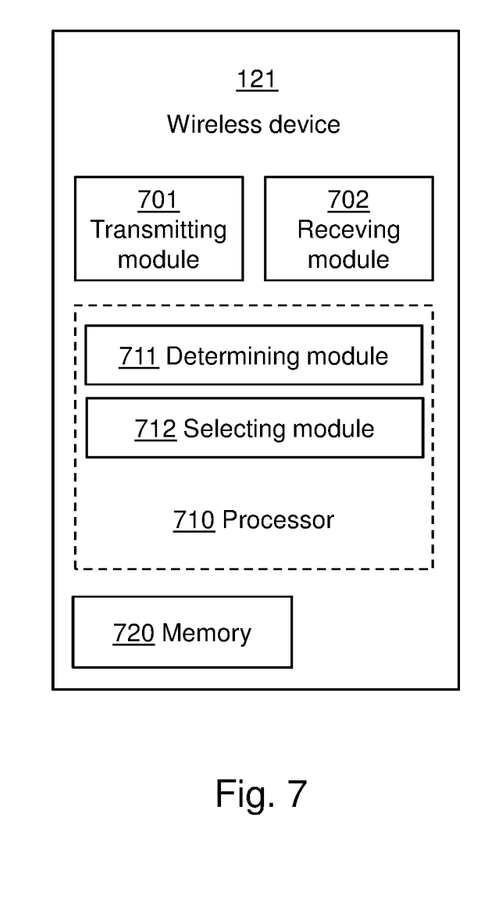
FIG. 7 is a schematic block diagram depicting embodiments of a network node.

To perform the method actions for performing an uplink control channel transmission in a serving cell 115 in a wireless communications network 100 when the wireless device 121 is configured with a set of serving cell(s) 115, 116, 117, 118 in the wireless communications network 100, the wireless device 121 may comprise the following arrangement depicted in FIG. 7.

FIG. 7 shows a schematic block diagram of embodiments of the wireless device 121. In some embodiments, the wireless device 121 may comprise a transmitting module 701, a receiving module 702, and a processor 710. The transmitting module 701 may also be referred to as transmitter or transmitting unit, and the receiving module 702 may also be referred to as a receiver or receiving unit.

The processor 710 may also be referred to as processing module, processing unit or processing circuitry. The processor 710, or a determining module 711 in the wireless device 121, is configured to determine a number of serving cells of the set of serving cell(s) 115, 116, 117, 118 that are relevant to consider when performing the uplink control channel transmission in the serving cell 115. The processor 710 is further configured to, or a selecting module 712 in the wireless device 121 is configured to, select an uplink control channel format from a set of uplink control channel formats for uplink control channel transmissions based on the determined number of serving cells. The processor 710 also controls the transmitter 701 and the receiver 702. Optionally, the processor 710 may be said to comprise one or more of the transmitter 701 and the receiver 702, and/or perform the function thereof as described below. The transmitter 701 is configured to perform the uplink control channel transmission in the serving cell 115 using the selected uplink control channel format.

In some embodiments, the processor 710, or the determining module 711 in the wireless device 121, may be further configured to determine the number of serving cells that are relevant to consider when performing the uplink control channel transmission to be one or more of the following: the number of serving cells in the set of serving cell(s) 115, 116, 117, 118 that are currently activated in the wireless device 121; the number of serving cells in the set of serving cell(s) 115, 116, 117, 118 that have been indicated to be activated by a network node (110) in the wireless communications network 100; the number of serving cells in the set of serving cell(s) 115, 116, 117, 118 that have been added, or configured, for the wireless device 121 by a network node 110 in the wireless communications network 100; the number of serving cells in the set of serving cell(s) 115, 116, 117, 118 that the wireless device 121 have been scheduled on; the number of serving cells in the set of serving cell(s) 115, 116, 117, 118 that the wireless device 121 have been scheduled on within a determined period of time; and the serving cell 115 in which the uplink control channel transmission is to be performed and one or more serving cells 116, 117, 118 that are mapped to the serving cell 115 in which the uplink control channel transmission is to be performed.

In some embodiments, the processor 710, or the selecting module 712 in the wireless device 121, may be further configured to select the uplink control channel format for the uplink control channel transmission from the set of uplink control channel formats based on one or more threshold values for the determined number of serving cells. In some embodiments, the processor 710, or the selecting module 712 in the wireless device 121, may be further configured to select the uplink control channel format for the uplink control channel transmission from the set of uplink control channel formats further based on the existence of and/or the length of a periodic Channel State Information, CSI, in the wireless device 121.

In some embodiments, the transmitter 701 may be configured to perform the uplink control channel transmission in the serving cell 115 using the selected uplink control channel format according to one or more of the following: at the beginning of the next subsequent subframe in the wireless communications network 100; at the beginning of the next subsequent radio frame in the wireless communications network 100; according to information received from a network node 110 in the wireless communications network 100; upon or after the expiry of a timer for switching the uplink control channel format for uplink control channel transmissions, and at a fixed or predetermined time instant. In some embodiments, the transmitter 701 may be configured to perform the uplink control channel transmission in the serving cell 115 using the selected uplink control channel format based on the configuration of the serving cell 115.

In some embodiments, the receiver 702 may be configured to receive information indicating the set of uplink control channel formats for uplink control channel transmissions from a network node 110 in the wireless communications network 100. In some embodiments, the receiver 702 may be configured to optionally also receive information indicating one or more criteria to be used by the wireless device 121 in determining a number of serving cells that are relevant to consider when performing uplink control channel transmissions in the serving cell 115. In some embodiments, the receiver 702 may be configured to further receive information indicating one or more threshold values to be used by the wireless device 121 when selecting an uplink control channel format from a set of uplink control channel formats based on the determined number of serving cells that are relevant to consider when performing uplink control channel transmissions in the serving cell 115. In some embodiments, the receiver 702 may be configured to receive the information in one or more Radio Resource Control, RRC, messages.

The embodiments for performing an uplink control channel transmission in a serving cell 115 in a wireless communications network 100 when the wireless device 121 is configured with a set of serving cell(s) 115, 116, 117, 118 in the wireless communications network 100 may be implemented through one or more processors, such as, e.g. the processor 710 in the wireless device 121 depicted in FIG. 7, together with computer program code for performing the functions and actions of the embodiments herein. The program code mentioned above may also be provided as a computer program product, for instance in the form of a data carrier carrying computer program code or code means for performing the embodiments herein when being loaded into the processor 710 in the wireless device 121. The computer program code may e.g. be provided as pure program code in the wireless device 121 or on a server and downloaded to the wireless device 121. The carrier may be one of an electronic signal, optical signal, radio signal, or computer-readable storage medium, such as, e.g. electronic memories like a RAM, a ROM, a Flash memory, a magnetic tape, a CD-ROM, a DVD, a Blueray disc, etc.

The wireless device 121 may further comprise a memory 720, which may be referred to or comprise one or more memory modules or units. The memory 720 may be arranged to be used to store executable instructions and data to perform the methods described herein when being executed in or by the processor 710 of the wireless device 121. Those skilled in the art will also appreciate that the processor 710 and the memory 720 described above may refer to a combination of analog and digital circuits, and/or one or more processors configured with software and/or firmware, e.g. stored in the memory 720, that when executed by the one or more processors, such as, the processor 710, cause the one or more processors to perform the method as described above. The processor 710 and the memory 720 may also be referred to as processing means. One or more of these processors, as well as the other digital hardware, may be included in a single application-specific integrated circuit (ASIC), or several processors and various digital hardware may be distributed among several separate components, whether individually packaged or assembled into a system-on-a-chip (SoC).

From the above it may be seen that some embodiments may comprise a computer program product, comprising instructions which, when executed on at least one processor, e.g. the processor 710, cause the at least one processor to carry out the method for performing an uplink control channel transmission in a serving cell 115 in a wireless communications network 100 when the wireless device 121 is configured with a set of serving cell(s) 115, 116, 117, 118 in the wireless communications network 100. Also, some embodiments may further comprise a carrier containing said computer program product, wherein the carrier is one of an electronic signal, optical signal, radio signal, or computer-readable storage medium.

Figure 8:
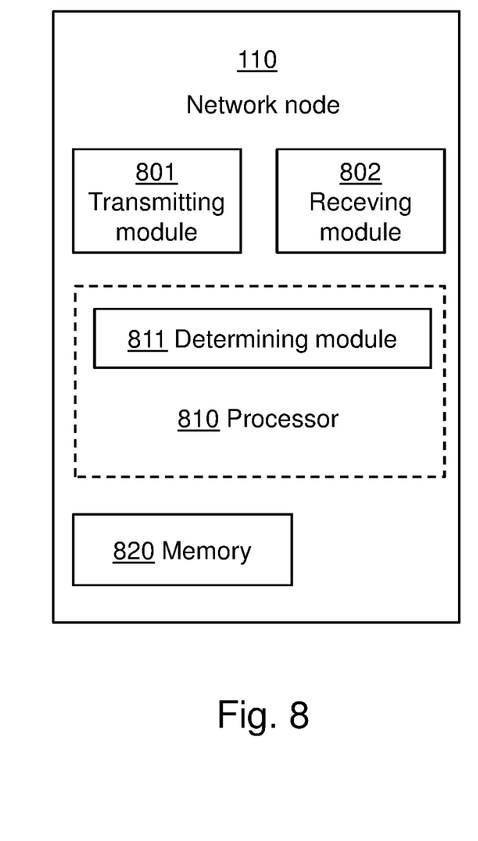
FIG. 8 is a schematic block diagram depicting embodiments of a wireless device.

To perform the method actions for enabling an uplink control channel transmission by a wireless device 121 in a serving cell 115 in a wireless communications network 100 when the wireless device 121 is configured with a set of serving cell(s) 115, 116, 117, 118 in the wireless communications network 100, the network node 110 may comprise the following arrangement depicted in FIG. 8.

FIG. 8 shows a schematic block diagram of embodiments of the network node 110. In some embodiments, the network node 110 may comprise a transmitting module 801, a receiving module 802, and a processor 810. The transmitting module 801 may also be referred to as transmitter or transmitting unit, and the receiving module 802 may also be referred to as a receiver or receiving unit.

The processor 810 may also be referred to as processing module, processing unit or processing circuitry. The processor 810, or a determining module 811 in the wireless device 121, is configured to determine a set of uplink control channel formats for uplink control channel transmissions for the wireless device 121. The processor 810 may control the transmitter 801 and the receiver 802. Optionally, the processor 810 may be said to comprise one or more of the transmitter 801 and the receiver 802, and/or perform the function thereof as described below. The transmitter 801 is configured to transmit information indicating the determined set of uplink control channel formats for uplink control channel transmissions for the wireless device 121 to the wireless device 121.

In some embodiments, the processor 810, or the determining module 811 in the network node 110, may be further configured to determine one or more criterions to be used by the wireless device 121 in determining a number of serving cells that are relevant to consider when performing uplink control channel transmissions in the serving cell 115. In this case, the transmitter 801 may be configured to transmit information indicating the one or more criterions to the wireless device 121.

In some embodiments, the processor 810, or the determining module 811 in the network node 110, may be further configured to determine one or more threshold values to be used by the wireless device 121 when selecting an uplink control channel format from the set of uplink control channel formats based on the determined number of serving cells that are relevant to consider when performing uplink control channel transmissions in the serving cell 115. In this case, the transmitter 801 may be configured to transmit information indicating the one or more threshold values to the wireless device 121.

In some embodiments, the transmitter 801 may be configured to transmit the information in one or more Radio Resource Control, RRC, messages.

The embodiments for enabling an uplink control channel transmission by a wireless device 121 in a serving cell 115 in a wireless communications network 100 when the wireless device 121 is configured with a set of serving cell(s) 115, 116, 117, 118 in the wireless communications network 100 may be implemented through one or more processors, such as, e.g. the processor 810 in the network node 110 depicted in FIG. 8, together with computer program code for performing the functions and actions of the embodiments herein. The program code mentioned above may also be provided as a computer program product, for instance in the form of a data carrier carrying computer program code or code means for performing the embodiments herein when being loaded into the processor 810 in the network node 110. The computer program code may e.g. be provided as pure program code in the network node 110 or on a server and downloaded to the network node 110. The carrier may be one of an electronic signal, optical signal, radio signal, or computer-readable storage medium, such as, e.g. electronic memories like a RAM, a ROM, a Flash memory, a magnetic tape, a CD-ROM, a DVD, a Blueray disc, etc.

The network node 110 may further comprise a memory 820, which may be referred to or comprise one or more memory modules or units. The memory 820 may be arranged to be used to store executable instructions and data to perform the methods described herein when being executed in or by the processor 810 of the network node 110. Those skilled in the art will also appreciate that the processor 810 and the memory 820 described above may refer to a combination of analog and digital circuits, and/or one or more processors configured with software and/or firmware, e.g. stored in the memory 820, that when executed by the one or more processors, such as, the processor 810, cause the one or more processors to perform the method as described above. The processor 810 and the memory 820 may also be referred to as processing means. One or more of these processors, as well as the other digital hardware, may be included in a single application-specific integrated circuit (ASIC), or several processors and various digital hardware may be distributed among several separate components, whether individually packaged or assembled into a system-on-a-chip (SoC).

From the above it may be seen that some embodiments may comprise a computer program product, comprising instructions which, when executed on at least one processor, e.g. the processor 810, cause the at least one processor to carry out the method for enabling an uplink control channel transmission by a wireless device 121 in a serving cell 115 in a wireless communications network 100 when the wireless device 121 is configured with a set of serving cell(s) 115, 116, 117, 118 in the wireless communications network 100. Also, some embodiments may further comprise a carrier containing said computer program product, wherein the carrier is one of an electronic signal, optical signal, radio signal, or computer-readable storage medium.

The terminology used in the detailed description of the particular embodiments illustrated in the accompanying drawings is not intended to be limiting of the described wireless device 121, network node 110 and methods therein which instead should be construed in view of the enclosed claims.

As used herein, the term "and/or" comprises any and all combinations of one or more of the associated listed items.

Further, as used herein, the common abbreviation "e.g.", which derives from the Latin phrase "exempli gratia," may be used to introduce or specify a general example or examples of a previously mentioned item, and is not intended to be limiting of such item. If used herein, the common abbreviation "i.e.", which derives from the Latin phrase "id est," may be used to specify a particular item from a more general recitation. The common abbreviation "etc.", which derives from the Latin expression "et cetera" meaning "and other things" or "and so on" may have been used herein to indicate that further features, similar to the ones that have just been enumerated, exist.

As used herein, the singular forms "a", "an" and "the" are intended to comprise also the plural forms as well, unless expressly stated otherwise. It will be further understood that the terms "includes," "comprises," "including" and/or "comprising," when used in this specification, specify the presence of stated features, actions, integers, steps, operations, elements, and/or components, but do not preclude the presence or addition of one or more other features, actions, integers, steps, operations, elements, components, and/or groups thereof.

Unless otherwise defined, all terms comprising technical and scientific terms used herein have the same meaning as commonly understood by one of ordinary skill in the art to which the described embodiments belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

The embodiments herein are not limited to the above described preferred embodiments. Various alternatives, modifications and equivalents may be used. Therefore, the above embodiments should not be construed as limiting.

ABBREVIATIONS

DAI Downlink Assignment Index
DCI Downlink Control Information
CA Carrier Aggregation
CC Component Carrier
CSI Channel State Information
CQI Channel Quality Indicator
DFTS-OFDM Discrete Fourier Transform Spread-OFDM
DL Downlink
EPDCCH Enhanced PDCCH
FDD Frequency Division Duplex
HARQ Hybrid Automatic Repeat Request
LTE Long Term Evolution
MAC Medium Access Control
MAC CE MAC Control Element
OFDM Orthogonal Frequency Division Multiplexing
PCell Primary Cell
PDCCH Physical Downlink Control Channel
PDSCH Physical Downlink Shared Channel
PUCCH Physical Uplink Control Channel
PUSCH Physical Uplink Shared Channel
RE Resource Element
RRC Radio Resource Control
SCell Secondary Cell
SC-FDMA Single Carrier-Frequency Domain Multiple Access
SR Scheduling Request
TDD Time Division Duplex
TPC Transmit Power Control
UE User Equipment
UL Uplink

What is claimed is:

1. A method performed by a wireless device for performing an uplink control channel transmission in a serving cell in a wireless communications network when the wireless device is configured with a set of serving cells based on Radio Resource Control (RRC) and Medium Access Control Elements (MAC CE) signalling, comprising the serving cell, in the wireless communications network, the method comprising:
   determining a number of serving cells of the set of serving cells being the number of serving cells that the wireless device has been scheduled on based on at least one of the group consisting of: a received Downlink assignment from a network node, a semi-persistent scheduling configuration, and a dynamic scheduling signalling from the network node;
   selecting an uplink control channel format from a set of uplink control channel formats for uplink control channel transmissions based on the determined number of serving cells; and
   performing the uplink control channel transmission in the serving cell using the selected uplink control channel format.

2. The method according to claim 1, wherein the number of serving cells of the set of serving cells is the number of serving cells that the wireless device has been scheduled on within a configured time period.

3. The method according to claim 2, wherein the uplink control channel format for the uplink control channel transmission is selected from the set of uplink control channel formats based on one or more threshold values for the determined number of serving cells.

4. The method according to claim 3, wherein the uplink control channel format for the uplink control channel transmission is selected from the set of uplink control channel formats further based on the existence of and/or the length of a periodic Channel State Information (CSI) in the wireless device.

5. The method of claim 4, wherein the uplink control channel transmission in the serving cell using the selected uplink control channel format is performed according to at least one of the group consisting of:
   at the beginning of a next subsequent subframe in the wireless communications network,
   at the beginning of a next subsequent radio frame in the wireless communications network,
   according to information received from the network node in the wireless communications network,
   upon or after the expiry of a timer for switching the uplink control channel format for the uplink control channel transmissions, and
   at a fixed or predetermined time instant.

6. The method according to claim 5, wherein the uplink control channel transmission in the serving cell using the selected uplink control channel format is performed based on a configuration of the serving cell.

7. The method according to claim 6, further comprising receiving information indicating the set of uplink control channel formats for the uplink control channel transmissions from the network node in the wireless communications network.

8. The method according to claim 7, wherein the information is received in an RRC message.

9. A wireless device for performing an uplink control channel transmission in a serving cell in a wireless communications network when the wireless device is configured with a set of serving cells based on Radio Resource Control (RRC) and Medium Access Control Elements (MAC CE) signalling, comprising the serving cell, in the wireless communications network, wherein the wireless device is configured to:
   determine a number of serving cells of the set of serving cells being the number of serving cells that the wireless device has been scheduled on based on one or more of a received Downlink assignment from a network node, a semi-persistent scheduling configuration, and/or a dynamic scheduling signalling from the network node, select an uplink control channel format from a set of uplink control channel formats for the uplink control channel transmissions based on the determined number of serving cells, and perform the uplink control channel transmission in the serving cell using the selected uplink control channel format.

10. The wireless device according to claim 9, wherein the number of serving cells of the set of serving cells comprises the number of serving cells that the wireless device has been scheduled on within a configured time period.

11. The wireless device according to claim 10, wherein the uplink control channel format for the uplink control channel transmission is selected from the set of uplink control channel formats based on one or more threshold values for the determined number of serving cells.

12. The wireless device according to claim 11, wherein the uplink control channel format for the uplink control channel transmission is selected from the set of uplink control channel formats further based on at least one of the group consisting of: the existence of a periodic Channel State Information (CSI) in the wireless device and the length of the periodic CSI.

13. The wireless device according to claim 12, wherein the uplink control channel transmission in the serving cell using the selected uplink control channel format is performed according to at least one of the group consisting of:

at the beginning of a next subsequent subframe in the wireless communications network, at the beginning of a next subsequent radio frame in the wireless communications network, according to information received from the network node in the wireless communications network, upon or after the expiry of a timer for switching the uplink control channel format for the uplink control channel transmissions, and at a fixed or predetermined time instant.

14. The wireless device according to claim 13, wherein the uplink control channel transmission in the serving cell using the selected uplink control channel format is performed based on a configuration of the serving cell.

15. The wireless device according to claim 14, further operable to:

receive information indicating the set of uplink control channel formats for the uplink control channel transmissions from the network node in the wireless communications network.

16. The wireless device according to claim 15, wherein the information is received in an RRC message.

* * * * *

UNITED STATES PATENT AND TRADEMARK OFFICE
CERTIFICATE OF CORRECTION

PATENT NO. : 11,581,975 B2  
APPLICATION NO. : 16/902785  
DATED : February 14, 2023  
INVENTOR(S) : Bergström et al.

Page 1 of 2

It is certified that error appears in the above-identified patent and that said Letters Patent is hereby corrected as shown below:

On the Title Page

On Page 2, in Item (56), under "OTHER PUBLICATIONS", in Column 2, Line 7, delete "WG2 #68," and insert -- WG2 Meeting #68, --, therefor.

In the Drawings

In Fig. 7, Sheet 5 of 5, for Tag "702", in Line 1, delete "Receving" and insert -- Receiving --, therefor.

In Fig. 8, Sheet 5 of 5, for Tag "802", in Line 1, delete "Receving" and insert -- Receiving --, therefor.

In the Specification

In Column 1, Line 9, delete "2019," and insert -- 2019, now U.S. Pat. No. 10,721,014, --, therefor.

In Column 1, Line 38, delete "(WiMax)," and insert -- (WiMAX), --, therefor.

In Column 1, Line 60, delete "rates up" and insert -- rates of up --, therefor.

In Column 2, Lines 2-3, delete "Single Carrier-Frequency Domain Multiple Access, SC-FDMA," and insert -- Single Carrier-Frequency Division Multiple Access, SC-FDMA, --, therefor.

In Column 3, Line 39, delete "a integer" and insert -- an integer --, therefor.

In Column 3, Line 41, delete "Medium Access, MAC," and insert -- Medium Access Control, MAC, --, therefor.

In Column 4, Line 24, delete "Scells." and insert -- SCells. --, therefor.

In Column 6, Line 33, delete "(WiMax)," and insert -- (WiMAX), --, therefor.

Signed and Sealed this  
Fourth Day of July, 2023

Katherine Kelly Vidal  
*Director of the United States Patent and Trademark Office*

CERTIFICATE OF CORRECTION (continued)
U.S. Pat. No. 11,581,975 B2

In Column 6, Line 38, delete "Node B, a Home eNode B," and insert -- NodeB, a Home eNodeB, --, therefor.

In Column 6, Line 54, delete "FIG. 3," and insert -- FIG. 4, --, therefor.

In Column 7, Line 9, delete "FIG. 3," and insert -- FIG. 4, --, therefor.

In Column 7, Lines 21-22, delete "Node B, a Home eNode B," and insert -- NodeB, a Home eNodeB, --, therefor.

In Column 9, Line 15, delete "assume the" and insert -- assume that the --, therefor.

In Column 9, Line 31, delete "serving 118" and insert -- serving cell 118 --, therefor.

In Column 10, Line 11, delete "network node 11 0" and insert -- network node 110 --, therefor.

In Column 12, Line 2, delete "in to" and insert -- into --, therefor.

In Column 16, Line 43, delete "Blueray disc," and insert -- Blu-ray disc, --, therefor.

In Column 18, Line 16, delete "Blueray disc," and insert -- Blu-ray disc, --, therefor.

In Column 19, Lines 54-55, delete "SC-FDMA Single Carrier-Frequency Domain Multiple Access" and insert -- SC-FDMA Single Carrier-Frequency Division Multiple Access --, therefor.

In the Claims

In Column 20, Line 1, in Claim 1, delete "Elements (MAC CE)" and insert -- Control Elements (MAC CE) --, therefor.

In Column 20, Line 33, in Claim 5, delete "The method of claim" and insert -- The method according to claim --, therefor.

In Column 20, Line 62, in Claim 9, delete "Medium Access Control Elements (MAC CE)" and insert -- Medium Access Control Control Elements (MAC CE) --, therefor.